(12) United States Patent
Stahl et al.

(10) Patent No.: US 8,261,700 B2
(45) Date of Patent: Sep. 11, 2012

(54) STEAM SUPERHEATER

(75) Inventors: Henrik Otto Stahl, Hørsholm (DK); Pat A. Han, Smørum (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 13/000,786

(22) PCT Filed: Jun. 17, 2009

(86) PCT No.: PCT/EP2009/004360
§ 371 (c)(1),
(2), (4) Date: Dec. 22, 2010

(87) PCT Pub. No.: WO2009/156085
PCT Pub. Date: Dec. 30, 2009

(65) Prior Publication Data
US 2011/0104037 A1    May 5, 2011

(30) Foreign Application Priority Data
Jun. 26, 2008 (DK) .................................. 2008 00881

(51) Int. Cl.
*F22G 3/00* (2006.01)
(52) U.S. Cl. ......... 122/483; 122/460; 165/161; 165/164
(58) Field of Classification Search .............. 122/15.1, 122/36, 460, 467, 468, 480, 483; 165/158, 165/159, 160, 161, 162, 163, 164
See application file for complete search history.

(56) References Cited

U.S. PATENT DOCUMENTS

| | | | |
|---|---|---|---|
| 4,213,954 A | 7/1980 | Pinto | |
| 4,545,976 A | 10/1985 | Osman | |
| 4,778,005 A * | 10/1988 | Smith | 165/160 |
| 4,907,643 A | 3/1990 | Grotz et al. | |
| 5,845,703 A | 12/1998 | Nir | |
| 6,726,851 B1 | 4/2004 | Thomsen | |
| 7,410,611 B2 * | 8/2008 | Salbilla | 422/22 |
| 7,988,927 B2 * | 8/2011 | Lehr et al. | 422/201 |
| 2006/0228284 A1 | 10/2006 | Schmidt | |

FOREIGN PATENT DOCUMENTS

| | | |
|---|---|---|
| EP | 0 268 469 A1 | 5/1988 |
| EP | 0 274 006 A1 | 7/1988 |
| EP | 0 535 505 A1 | 4/1993 |
| EP | 1 610 081 A1 | 12/2005 |
| GB | 2 089 951 A | 6/1982 |

* cited by examiner

*Primary Examiner* — Gregory A Wilson
(74) *Attorney, Agent, or Firm* — Dickstein Shapiro LLP

(57) ABSTRACT

Process for the production of ammonia from a hydrocarbon feedstock all steam produced in the waste heat boilers of the reforming and ammonia section of the plant is superheated in one or more steam superheaters located downstream the ammonia converter in the ammonia section of the plant. There is no need for steam superheater (s) in the reforming section of the plant to cool the synthesis gas. A steam superheater for use in the process is also provided. The superheater comprises two compartments in which the first and second compartments are connected in series with respect to the steam flow and in parallel with respect to the process gas flow.

4 Claims, 2 Drawing Sheets

STEAM SUPERHEATER

This invention relates to a process for the production of ammonia from a hydrocarbon feedstock with improved heat integration in which the hydrocarbon feedstock is first converted into synthesis gas by steam reforming and the synthesis gas is subsequently converted into ammonia. The invention relates also to a novel steam superheater particularly suitable for use in the process, and more particularly for use in large ammonia plants having capacities of at least 2000 MTPD.

Conventional plants for the production of ammonia are normally divided in two main sections, a reforming section in which a hydrocarbon feedstock such as natural gas is converted to synthesis gas containing a mixture of hydrogen and nitrogen at pressures in the range 30 to 80 bar, often 30 to 40 bar, and an ammonia synthesis section in which the synthesis gas (ammonia synthesis gas) having the right proportion of hydrogen and nitrogen and after being compressed to 120-200 bar is catalytically converted into ammonia which is subsequently condensed by cooling.

In the reforming section, synthesis gas containing hydrogen is produced at high temperatures for instance at about 1000° C. or higher when utilising conventional process layouts with primary, autothermal or secondary reformers. The synthesis gas produced in said reformers has to be cooled and this is normally achieved by passing the gas through a number of waste heat boilers and steam superheaters. These apparatuses are expensive and highly sophisticated heat exchangers that need to be carefully designed in order to minimize the risks of mechanical and material related failures associated with metal dusting, hydrogen attack and stress corrosion. In particular, steam superheaters in the reforming section are expensive apparatuses in which metal dusting is difficult to prevent despite careful construction of these units. The risk of metal dusting is in practice inherent when using superheaters in the reforming section.

In the ammonia synthesis section, ammonia is produced catalytically from the mixture of hydrogen and nitrogen contained in the synthesis gas. The conversion into ammonia occurs under the production of heat, which is utilized in waste heat boilers and optionally in steam superheaters to produce high pressure steam, which is further used for driving compressors in the ammonia synthesis section. Waste heat boilers and steam superheaters in the ammonia synthesis section are also expensive and highly sophisticated heat exchangers, which are particularly designed to minimize the risks of mechanical and material related failures associated with hydrogen attack, nitriding and stress corrosion. Waste heat boilers are particularly exposed to nitriding and stress corrosion, as these units normally are arranged downstream the ammonia converter.

Metal dusting, stress corrosion and nitriding are catastrophic or at least severe forms of corrosion which must be avoided by means of proper design and material selection. Metal dusting occurs normally under the presence of carbon monoxide in the gas which is in contact with the metal and when the metal temperature is so low, normally 400° C. to 800° C., more specifically 500° C. to 750° C., that the interaction with the gas results in the disintegration of the metal into fine particles.

Nitriding of the metal occurs when nitrogen from the gas in contact with the metal diffuses into the metal material and generates nitrides. A hard surface layer is thereby formed which easily cracks and in worst cases the cracks extend throughout the metal. Thus, materials subjected to nitriding are more prompt to become brittle. The thickness of the nitriding layer depends on temperature, time and metal alloy. It is generally recognized that metal temperatures of above about 380° C. for thin metal sheets and above 400° C. for thick metal sheets of low alloyed carbon steel significantly increase the propensity to nitriding of the metal. At higher temperatures, materials such as stainless steel or Inconel are required.

Stress corrosion represents a risk when austenitic materials such as stainless steel come into contact with water, particularly when water contains impurities such as chlorine. The risk of stress corrosion is much less when utilising low alloyed carbon steel.

As the capacity of ammonia plants is steadily on the rise with plants being designed to produce 2000, 3000, 5000 MTPD ammonia or even more, the design of larger and larger steam superheaters has become a formidable challenge. The size of the steam superheaters is a problem in such large ammonia plants since under standard design the diameter and thickness of the tubesheets of the superheater become simply so large that its production is not technically or economically feasible.

This trend in erecting larger plants has also triggered a necessity of providing steam for driving compressors in the plant. This requires higher steam pressures and thereby higher steam temperatures are needed. As a result, expensive materials for the steam superheaters which can cope with the higher steam temperatures such as stainless steel or Inconel have to be used.

U.S. Pat. No. 4,213,954 describes a process for the production of ammonia comprising a reforming section and ammonia synthesis section. Both sections share a common steam drum which serves as steam separation unit for waste heat boilers in the reforming and ammonia synthesis section of the plant. Steam, produced in the reforming section, is thereby used in the ammonia synthesis section, while the process gas from the secondary reformer is cooled by passage through a system of not only waste heat boilers but also a superheater. Steam is also used in expansion engines to recover power.

U.S. Pat. No. 4,545,976 describes a process for the production of ammonia synthesis gas by the steam reforming of hydrocarbon with reduced steam export, wherein process gas from the secondary reformer is cooled using series steam superheaters.

Our EP-A-1,610,081 discloses a heat exchanger for use immediately downstream a steam reforming stage. The heat exchanger comprises a first colder heating zone containing a tube bundle of a low alloy steel and a second hotter heating zone containing a tube bundle made of a temperature and corrosion resistant alloy such as austenitic nickel/chromium/iron alloy. Steam is passed through the tube side of the heat exchanger and reformed gas (synthesis gas) on the shell side. The colder and hotter heating zones are connected in series with respect to both the steam flow and the reformed gas flow.

It is an object of the invention to provide a process for the production of ammonia with improved heat integration and with reduced propensity to metal dusting, nitriding and stress corrosion in waste heat boilers and particularly in the steam superheaters of the plant.

It is another object of the invention to provide a process for the production of ammonia with improved heat integration with reduced steam export and which is much more cost-effective than prior art processes.

It is a further object of the invention to provide a process, which is robust and less sensitive to plant trips in the ammonia section.

It is yet another object of the invention to provide a steam superheater suitable for use in large ammonia plants that at the same time withstands corrosion, particularly nitriding and stress corrosion.

These and other objects are solved by the present invention.

In a first aspect, we provide a process for the production of ammonia from a hydrocarbon feedstock comprising the steps of:

(a) passing the hydrocarbon feedstock through a reforming section and withdrawing a synthesis gas from said reforming section;

(b) passing said synthesis gas through one or more waste heat boilers, without the use of a steam superheater, and in which the synthesis gas is in indirect heat exchange with a water-steam mixture, withdrawing steam from said waste heat boilers and conducting said steam into one or more steam drums;

(c) passing the thereby cooled synthesis gas of step (b) through a shift conversion stage for converting carbon monoxide in the synthesis gas into hydrogen and subsequently through a washing process for removing remaining carbon dioxide, carbon monoxide and methane in the synthesis gas, and withdrawing a synthesis gas containing nitrogen and hydrogen;

(d) passing the synthesis gas produced in step (c) through an ammonia synthesis section which comprises the catalytic conversion of the synthesis gas into ammonia by passage through one or more catalytic beds in an ammonia converter, and withdrawing a process gas containing ammonia from the one or more catalytic beds;

(e) passing said process gas containing ammonia through one or more steam superheaters in which steam from the one or more steam drums of step (b) is superheated and withdrawing a stream of superheated steam from said one or more steam superheaters;

(f) passing the thereby cooled process gas of step (e) through one or more waste heat boilers in which the process gas is in indirect heat exchange with a water-steam mixture, withdrawing steam from said one or more waste heat boilers, and conducting said steam into the one or more steam drums of step (b).

Hence, all steam produced in the waste heat boilers of step (b) and step (f) is superheated in the one or more superheaters of step (e). As much cooling as possible is thus conducted in the ammonia synthesis section.

We have found that by incorporating one or more superheaters downstream the ammonia converter, which serve to cool the process gas containing ammonia and to superheat all the steam produced in the waste heat boiler of the reforming section, it is possible to provide a simpler and more inexpensive construction of the otherwise required waste heat boilers in the reforming section and also of the waste heat boilers and particularly the superheater(s) in the ammonia synthesis section of the plant. Accordingly, the invention offers the significant advantage that there is no need for a synthesis gas-heated steam superheater (process gas heated superheater), or simply, steam superheaters in the reforming section of the plant to cool the produced synthesis gas. The cooling capacity of the superheater(s) is as such moved from the reforming section to the ammonia synthesis section of the plant. The risk of metal dusting which is in practice inherent when using steam superheaters in the reforming section is thus completely eliminated.

In addition, since as much cooling as possible is conducted in the ammonia synthesis section the process enables the cooling of the process gas from the ammonia converter in a steam superheater, preferably in the form of a U-tube heat exchanger to a temperature below about 380° C., whereby nitriding of waste heat boiler(s) arranged downstream is avoided. As mentioned above, metal temperatures of above about 380° C. significantly increase the propensity to nitriding effects. The waste heat boiler(s) in the ammonia synthesis section, now cooling process gas having a temperature below 380° C. may then be constructed expediently as U-tube heat exchanger(s) in e.g. carbon steel alloy, thereby eliminating also the problems associated with stress corrosion of otherwise required austenitic materials. Cheaper materials may thus be used in the construction of the otherwise highly expensive waste heat boilers and steam superheaters.

A significant advantage of the invention is that the plant comprising the reforming and ammonia section becomes more robust to plant trip situations in which e.g. ammonia production in the ammonia synthesis section stops while the reforming section keeps running. According to conventional process layouts, when such plant trips in the ammonia section occur the steam generation in the reforming section is immediately influenced. To compensate for this effect, the waste heat boiler in the reforming section to cool the synthesis gas downstream the secondary reformer is normally significantly oversized. By the process of the present invention it is possible to reduce such influence on steam generation in the reforming section. If there is a plant trip in the ammonia section, it is now possible to balance the steam generation in the reforming section and as a result there is no need to significantly oversize the waste heat boiler(s) downstream the secondary reformer in this section. Smaller and thereby more inexpensive waste heat boilers may be used.

The reforming section may comprise the reforming of the hydrocarbon feedstock in one or more steps as it is conventional in the art. Hence the hydrocarbon feed may for instance be subjected to a pre-reforming step followed by primary and secondary reforming, or the hydrocarbon feed, e.g. natural gas, may be passed directly to an autothermal reforming step in order to produce the hot synthesis gas. The synthesis gas is withdrawn from the autothermal or secondary reforming step at temperatures above 1000° C. before it is cooled under the production of high pressure steam in the one or more waste heat boilers.

As used herein, the term synthesis gas containing nitrogen and hydrogen means ammonia synthesis gas, i.e. synthesis gas having the right proportions of hydrogen and nitrogen used as feed to the ammonia converter.

As used herein, the terms secondary reforming and autothermal reforming are used interchangeably, as secondary reforming is normally carried out in an autothermal reformer (ATR). Strictly speaking, however, the term autothermal reforming makes proper sense only when there is no primary reforming.

As used herein, the term primary reforming means reforming of the hydrocarbon feedstock in a conventional fired tubular reformer (radiant furnace).

It would also be understood that according to the invention, process gas leaving the catalytic ammonia converter passes first through steam superheated(s) and subsequently through waste heat boiler(s). All the steam produced in the waste heat boiler(s) of the reforming section, as well as the steam produced in the waste heat boiler(s) of the ammonia synthesis section is conducted to the first steam superheater arranged downstream the catalytic ammonia converter. At least part of the steam from said steam superheater may also be used as process steam in the reforming section of the plant, preferably as process steam in the waste heat section of the primary reforming stage.

In a preferred embodiment of the invention, step (a) involving passing the hydrocarbon feedstock through a reforming section and withdrawing a synthesis gas from said reforming section comprises the steps of: passing the hydrocarbon feedstock through a primary reforming step to produce a partly reformed gas, passing said partly reformed gas through a heat exchange reforming step and secondary reforming step and withdrawing a resulting stream of synthesis gas from said heat exchange reforming stage, wherein the partly reformed gas passing through the heat exchange reforming stage is reformed by indirect heat exchange with synthesis gas withdrawn from said secondary reforming step.

The heat exchange reforming enables the use of heat from the primary and secondary reforming step for further reforming of the gas rather than the heat simply being used for steam production. Therefore, it is also possible to reduce steam production significantly and actually down to an amount that almost exactly fulfils the demands of the ammonia synthesis section. As a result inexpedient steam export is avoided.

As mentioned previously, it is generally accepted that the risk of metal dusting is highest when the temperature of the metal is in the range 400° C. to 800° C., more specifically 500° C. to 750° C. Thus, preferably the stream of synthesis gas withdrawn from the reforming section, particularly the stream of synthesis gas withdrawn from said heat exchange reforming stage has a temperature about 800° C. or higher, which is high enough to reduce the risk of metal dusting in the heat exchanger itself as well as avoiding metal dusting in the waste heat boilers located downstream.

Preferably, the heat exchange reforming is conducted in one or more heat exchanger reactors comprising double-tubes. A double-tube is basically an arrangement of two substantially concentric tubes. The space in between the tube walls defines an annular cavity through which the heat exchanging medium (synthesis gas withdrawn from said secondary reforming step) can flow. The solid catalyst in the bed may be disposed outside and/or inside the double-tubes.

Accordingly, in another embodiment the invention also encompasses forming a combined gas within one or more heat exchange reactors having a plurality of double-tubes, and which are used for conducting said heat exchange reforming step by mixing, preferably at the bottom of the one or more heat exchange reactors, the synthesis gas withdrawn from said secondary reforming step with the reformed gas leaving the catalyst bed disposed at least outside the double-tubes of the one or more heat exchange reactors and passing said combined gas through the annular space of said double-tubes for indirect heating of said catalyst bed. A resulting stream of synthesis gas is then withdrawn and passed through the one or more waste heat boilers arranged down-stream in the reforming section.

Preferably, the solid catalyst particles of the catalyst bed of the one or more heat exchange reactors are disposed not only outside the double tubes, but also inside, i.e. also within the inner tubes of the double-tubes.

In yet another embodiment the heat exchange reforming step is conducted in a bayonet type reactor. In a particular, embodiment of the bayonet tube type reactor at least one reformer tube in this reformer is provided with an outer an inner tube, the outer tube is provided with an inlet end for introducing the process gas to be reformed and a closed outlet end, the inner tube is open at both ends and is coaxially arranged within the outer tube and spaced apart the outer tube, the annular space between the outer and inner tube is filled with reforming catalyst, the inner tube is adapted to withdraw an effluent stream of reformed gas, the outer tube optionally being concentrically surrounded by a sleeve spaced apart the outer tube and being adapted to pass the hot synthesis gas stream from the secondary reformer in heat conducting relationship with process gas to be reformed (reacting feedstock) in the outer tube by conducting the synthesis gas stream from the secondary reformer in the space between the sleeve and the outer tube. A particular embodiment of such a bayonet type reactor is for instance disclosed in our EP-A-0 535 505.

In a further embodiment of the invention the hydrocarbon feedstock to be reformed in step (a) is passed in parallel to one or more heat exchange reforming steps and an auto-thermal or secondary reforming step, and the hot synthesis gas withdrawn from said autothermal or secondary reforming stage is used as heat exchanging medium in said one or more heat exchange reforming steps, as described in our U.S. Pat. No. 6,726,851.

In a second aspect of the invention, we provide a steam superheater for use in the process, more particularly a steam superheater for use according to process step (e), i.e. downstream a catalytic ammonia converter.

Accordingly, the invention encompasses also a steam superheater 30 comprising:

first and second compartment 301, 302, in which the first compartment 301 is provided with a shell 305, a tube sheet 303, a rear end 307, tube bundle 309, baffle plates 317 and steam inlet 315 adapted to shell 305, and in which the second compartment 302 is provided with a shell 306, a tube sheet 304, a rear end 308, tube bundle 310, baffle plates 317 and steam outlet 316 adapted to shell 306;

a transition compartment 311 that separates the first and second compartment and which is defined by a space in between tubesheets 303, 304;

a channelling pipe 312 passing through tubesheets 303, 304 and thereby through the transition chamber 311 which extends from the first compartment 301 to the second compartment 302 along the length axis 320 of the steam superheater 30;

a separation wall 321 positioned between inlet chamber 318 and outlet chamber 319;

said transition compartment 311 is provided with process gas inlet 313 which extends into inlet chamber 318 of the transition compartment, the inlet chamber 318 being confined between the wall of channelling pipe 312, the wall of tubesheet 303 on the one side and into which tube bundle 309 of the first compartment 301 extends, and the wall of tubesheet 304 on the opposite side and into which tube bundle 310 of the second compartment 302 extends;

said transition compartment 311 is provided with process gas outlet 314 which extends from outlet chamber 319 of the transition compartment, the outlet chamber 319 being confined between the wall of channelling pipe 312, the wall of tubesheet 303 on the one side and into which tube bundle 309 of the first compartment 301 extends, and the wall of tubesheet 304 on the opposite side into which tube bundle 310 of the second compartment 302 extends;

and wherein the first and second compartments 301, 302 are connected in series with respect to the steam flow and in parallel with respect to the process gas flow.

Steam is passed through the shell side of the superheater, while the process gas from the ammonia converter is passed through the tube side.

Preferably, the process gas inlet 313 and process gas outlet 314 of the transition compartment 313 are positioned diametrically opposed to each other in the shell 305, 306 of the steam superheater, and more preferably said process gas inlet and outlet 313, 314 are positioned diametrically opposed to each other and at the same location along the length axis 320 of the steam superheater.

The separation wall 321 positioned between inlet chamber 318 and outlet chamber 319 extends preferably along and throughout the length direction of channelling pipe 312. This wall serves to prevent the direct passage of the process gas of inlet chamber 318 into outlet chamber 319. Preferably, the tube bundle in either compartment of the superheater is a U-tube bundle.

The tube bundle extends into either tubesheet and is therefore supported therein. It would be understood that the tubes penetrate the tubesheets. The tubes are therefore in fluid communication with the inlet chamber of the transition compartment which receives incoming hot process gas from the ammonia converter, or with the outlet chamber of the transition compartment from which cooled process gas is withdrawn.

In a particular embodiment the outlet chamber 319 further comprises valves 322, 323 arranged therein and which are in direct fluid communication with tube bundles 309, 310 of the first and second compartment 301, 302. The valves are preferably throttle-valves. The provision of valves in the outlet chamber enables that the right proportions of process gas from the ammonia converter are supplied to the first (cold) and second (hot) compartment of the steam superheater and thereby it is possible by simple means to regulate the temperature of the steam leaving the superheater at steam outlet 316. Preferably, 40 wt % of the process gas passes through the first compartment and 60 wt % to the second compartment. By regulating the steam outlet temperature in the superheater, which may be about 375° C., it is also possible to regulate the final superheat temperature of this steam after it has passed the waste heat section of the primary reformer, where it is further heated to a final superheat temperature of for instance 515° C. This final steam temperature is in practice the one that needs to be regulated, and such regulation becomes now feasible by simply regulating the steam temperature leaving the superheater at steam outlet 316. Inexpedient alternatives to regulate such final superheat temperature, such as addition of boiler feed water (BFW) to quench the steam under its passage through the waste heat section of the primary reformer, are avoided.

The process of the invention enables that saturated steam is introduced into the first compartment of the superheater at a relatively low temperature (323° C.). This steam will contain some carry-over from the steam drum in the form of water droplets. This can result in stress corrosion of the superheater internal metal parts if these are made of austenitic material for instance stainless steel. However, in the steam superheater of the present invention the internal metal parts, mainly the tube bundle in the first compartment, are preferably made of low alloy steel. Since the first (cold) compartment can be kept below 380° C. because of the incoming cold steam (323° C.), it is possible to use low alloy steel such as low alloy carbon steel and without risking nitriding effects. The internal metal parts in the second (hot) compartment, mainly the tube bundle, are made of stainless steel because of the risk of nitriding, as temperatures cannot be kept below 380° C. throughout this compartment. The risk of stress corrosion is no longer relevant in this compartment because water droplets carried over with the incoming steam have been heated through its passage in the first compartment and the steam is therefore dry.

Hence, according to a further embodiment of the invention, the tube bundle in the first compartment is made of low alloy steel such as ferritic iron, chromium, molybdenum and carbon steel, and the tube bundle in the second compartment is made of stainless steel. Preferably, the low alloy steel is low alloy carbon steel.

Apart from solving corrosion problems, the superheater of the invention is particularly advantageous for large ammonia plants, where the size of the superheaters under standard design becomes so large that they simply become impossible to fabricate. By the superheater of the present invention, the process gas stream from the ammonia converter is split into the first and second compartment. In other words, only a portion of the process gas stream passes each tubesheet and at the same time the tubesheets are supported by the channel pipe which extends from one compartment to the other along the length axis of the superheater. This result in a considerable reduction of tubesheet thickness compared to a situation with a conventional single tubesheet. The invention enables therefore also a simpler and more inexpensive construction. The superheater can be fabricated practically in any specialised workshop.

As used herein the term "large ammonia plants" means ammonia plants with capacities equal or greater than 2000 MTPD, for instance 3000, 5000 MTPD or even more.

For convenience, the orientation of superheaters is normally horizontal as heavy tubesheets and head sections are normally arranged near the rear ends of the superheater. Such horizontal orientation may, however, convey corrosion problems particularly in metal parts arranged in the middle section of the superheater. Particularly under start-up when the metal parts of the steam superheater are not allowed to warm up, water droplets containing impurities such as chlorine may accumulate and condense therein. Since such metal parts are often not made of corrosion resistant materials, severe corrosion problems may thus arise.

By the invention, it is possible to further prevent such corrosion problems by simply arranging the superheater in a vertical orientation. This orientation is much easier to achieve in the superheater of the present invention because the heavy metal parts which mainly comprise the tubesheets are arranged towards the middle of the unit. Potential water droplets containing impurities accumulate and collect at the bottom of the superheater in the first or second compartment. The accumulated water is then simply withdrawn through an outlet conduit arranged therein.

Hence, in yet another embodiment of the invention the orientation of the steam superheater is vertical and the first or second compartment further comprises at its rear end a water outlet for the removal of accumulated water. Preferably, the bottom portion of the steam supereheater in this vertical orientation is the second (hot) compartment.

Figure 1:
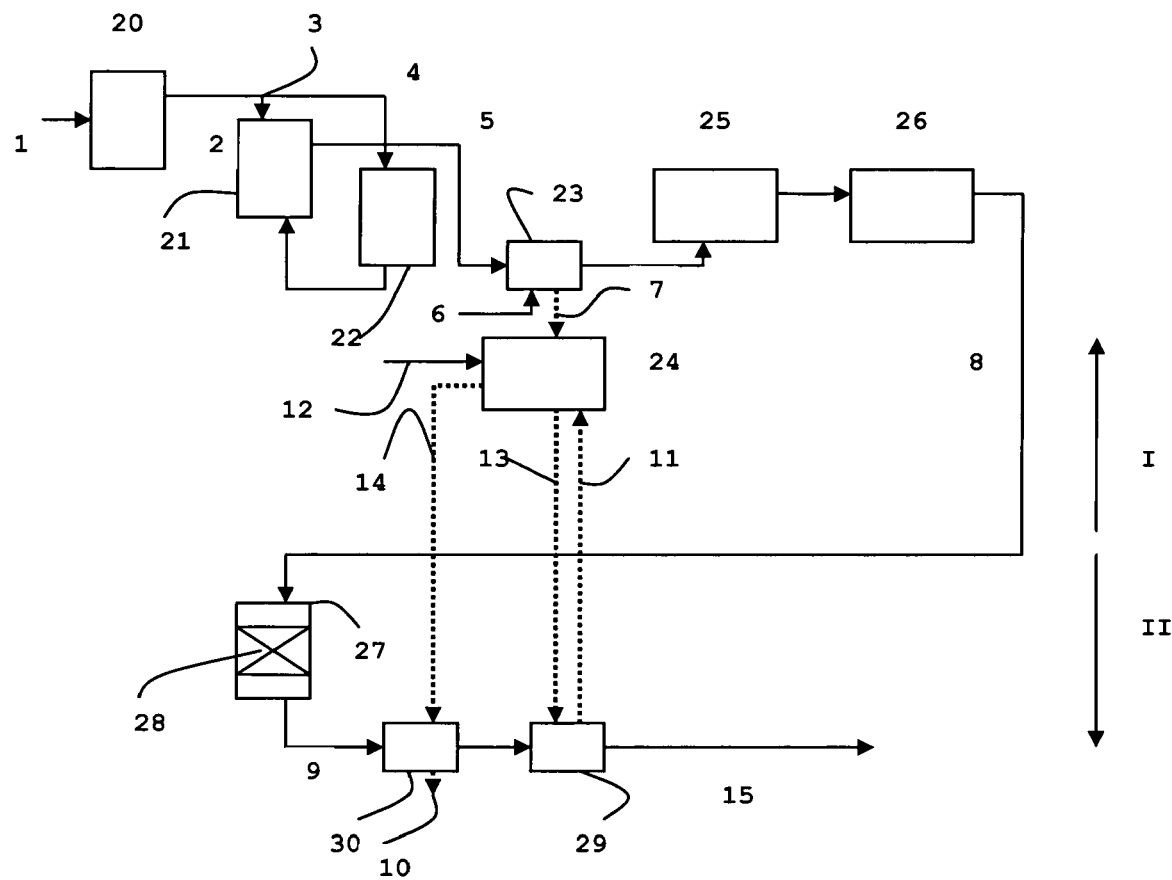
FIG. 1 shows a block diagram of a particular embodiment of the process in a plant for ammonia synthesis showing reforming section I incorporating a heat exchange reformer and secondary reformer and ammonia synthesis section II.

In FIG. 1 a hydrocarbon feedstock 1 such as natural gas is passed through a primary reforming step with addition of steam in primary reformer 20. A partly reformed gas 2 is withdrawn from the primary reformer 20 and divided in partial streams 3 and 4. Stream 3 is conducted to the top of a heat exchange reformer 21 having double-tubes disposed therein with catalyst particles arranged outside and inside the double-tubes, while partial stream 4 is passed through secondary reformer 22. At the bottom of heat exchange reformer 21 the hot effluent gas from the secondary reformer is combined with the converted process gas in the heat exchange reformer which leaves the catalyst beds at the bottom of the reformer. The combined gas is used for the indirect heating of the catalyst beds disposed therein by letting pass said combined gas upwardly in the reformer. The combined gas is cooled as it passes through the heat exchange reformer and leaves as synthesis gas stream 5. Stream 5 is then cooled in waste heat boiler 23 being fed with feed water 6, and wherein the synthesis gas is in indirect heat exchange with the steam. No steam superheater is used in this section. Steam-water mixture from waste heat boiler 23 is conducted to steam drum 24. The cooled synthesis gas stream is enriched in hydrogen in water gas shift section 25 and is subsequently passed through washing section 26 for the removal of remaining carbon monoxide, carbon dioxide and methane in the synthesis gas. An ammonia synthesis gas stream 8 containing the right proportions of hydrogen and nitrogen is thereby produced and is conducted to catalytic ammonia converter 27 of the ammonia synthesis section of the plant and comprising a plurality of ammonia catalyst beds 28. Process gas at 460° C. containing ammonia 9 is withdrawn from the catalytic converter and cooled by passage through a system of steam superheater 30 and waste heat boiler 29. After the steam superheater 30, the process gas is cooled to about 380° C. The produced superheated steam 10 leaves at about 375° C. and may be used for driving compressors in the plant, while steam 11 from waste heat boiler 29 is conducted to steam drum 24. Boiler feed water (BFW) is added as stream 12, while a stream 13 from the steam drum 24 is used for production of steam in waste heat boiler 29. All the steam, which is produced in waste heat boiler 23 of the reforming section and waste heat boiler 29 of the ammonia synthesis section, is superheated via steam stream 14 in the form of high pressure steam at boiling point of 323° C. in steam superheater 30 of the ammonia synthesis section. The cooled process gas containing ammonia is withdrawn as stream 15.

Figure 2:
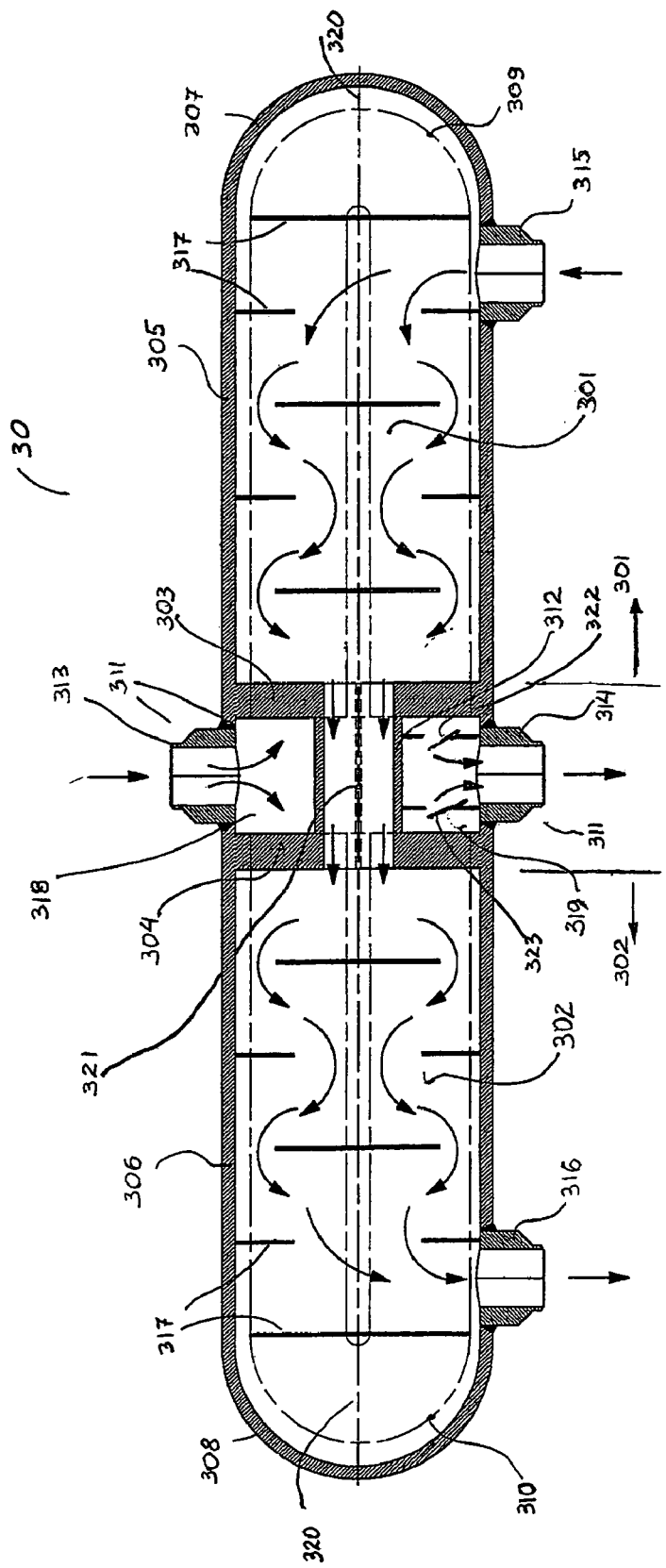
FIG. 2 shows a schematic of the superheater according to the invention for use in the ammonia synthesis section of the plant.

Turning now to FIG. 2 a schematic of the superheater 30 in FIG. 1 is shown. The superheater comprises a first (cold) compartment 301 and second (hot) compartment 302, two tubesheets 303, 304, two shells 305, 306 with respective rear ends 307, 308, two U-tube bundles 309, 310 as well as transition compartment 311 and channelling pipe 312. This channelling pipe extends at the center of the steam superheater from the first compartment 301 to the second compartment 302 along the length axis 320 of the superheater. The superheater includes also a process gas inlet 313 and process gas outlet 314 arranged as a part of the transition compartment 311, as well as steam inlet 315 arranged in the shell 305 of the first compartment 301 and steam outlet 316 arranged in the shell 306 of the second compartment 302. Baffle plates 317 are disposed in the first and second compartments to deflect the steam flow and thereby increase heat transfer. The baffles provide also support for tube bundles. The transition compartment 311 includes an inlet chamber 318 in direct extension to the process gas inlet 313 and in fluid communication with the tube bundle 309, 310 extending into the tubesheets 303, 304. The transition compartment 311 includes also an outlet chamber 319 which extends directly into the process gas outlet 314; the outlet chamber 319 is also in fluid communication with the tube bundle 309, 310 extending into the tubesheets 303, 304. The separation wall 321 extending along the channelling pipe section 312 divides the inlet and outlet chambers 318, 319. Thereby, the first and second compartments are connected in series with respect to the steam flow and in parallel with respect to the process gas flow. Throttle-valves 322 and 323 located in outlet chamber 319 serve to control the amount of process gas passing through the first (cold) and second (hot) compartment and thereby also the steam outlet temperature at steam outlet 316.

The process of the invention enables i.e. the provision of saturated steam to the superheater at relatively low temperature (323° C.). Steam enters at this temperature through steam inlet 315 near the rear end of the first (cold) compartment, where it then flows through its shell side. Here the steam is superheated to 345° C. and passes at this temperature via channelling pipe 312 to the second (hot) compartment of the superheater. The steam is further superheated and leaves through steam outlet 316 as superheated steam at 375° C. Process gas from the ammonia converter enters the superheater at 460° C. through process gas inlet 313 into inlet chamber 318 of transition compartment 311. The process gas is divided and passes to the first and second compartments via tubesheets 303, 304 into U-tube bundles 309, 310. After passing through the U-tubes the process gas enters via tubesheets 303, 304 into outlet chamber 319 via throttle-valves 322, 323. Process gas from the first compartment enters into the outlet chamber 319 at 373° C., while process gas from the second compartment enters at 403° C. The combined gas in this chamber reaches a temperature of 380° C. and leaves through process gas outlet 314 for further cooling in downstream waste heat boiler(s).

The invention claimed is:

1. Steam superheater (30) comprising:
   first and second compartment (301, 302), in which the first compartment (301) is provided with a shell (305), a tube sheet (303), a rear end (307), tube bundle (309), baffle plates (317), and steam inlet (315) adapted to shell (305), and in which the second compartment (302) is provided with a shell (306), a tube sheet (304), a rear end (308), tube bundle (310), baffle plates (317), and steam outlet (316) adapted to shell (306);
   a transition compartment (311) that separates the first and second compartment and which is defined by a space in between tubesheets (303, 304);
   a channelling pipe (312) passing through tubesheets (303, 304) and thereby through the transition chamber (311) and which extends from the first compartment (301) to the second compartment (302) along the length axis (320) of the steam superheater (30);
   a separation wall (321) positioned between inlet chamber (318) and outlet chamber (319);
   said transition compartment (311) is provided with process gas inlet (313) which extends into inlet chamber (318) of the transition compartment, the inlet chamber (318) being confined between the wall of channelling pipe (312), the wall of tubesheet (303) on the one side and into which tube bundle (309) of the first compartment (301) extends, and the wall of tubesheet (304) on the opposite side and into which tube bundle (310) of the second compartment (302) extends;
   said transition compartment (311) is provided with process gas outlet (314), which extends from outlet chamber (319) of the transition compartment, the outlet chamber (319) being confined between the wall of channelling pipe (312), the wall of tubesheet (303) on the one side and into which tube bundle (309) of the first compartment (301) extends, and the wall of tubesheet (304) on the opposite side into which tube bundle (310) of the second compartment (302) extends; and
   wherein the first and second compartments 301, 302 are connected in series with respect to the steam flow and in parallel with respect to the process gas flow.

2. Steam superheater according to claim 1, wherein the outlet chamber (319) further comprises valves (322, 323)

arranged therein and which are in direct fluid communication with tube bundles (309, 310) of the first and second compartment (301, 302).

3. Steam superheater according to claim 1, wherein the tube bundle in the first compartment is made of low alloy steel and the tube bundle in the second compartment is made of stainless steel.

4. Steam superheater according to claim 1, wherein the orientation of the steam superheater is vertical and the first or second compartment further comprises at its rear end a water outlet for the removal of accumulated water.

\* \* \* \* \*